United States Patent
Tomlinson

(10) Patent No.: US 12,500,539 B2
(45) Date of Patent: Dec. 16, 2025

(54) SOLAR A/C DIRECT MOTOR DRIVE

(71) Applicant: James Tomlinson, Houston, TX (US)

(72) Inventor: James Tomlinson, Houston, TX (US)

( * ) Notice: Subject to any disclaimer, the term of this patent is extended or adjusted under 35 U.S.C. 154(b) by 0 days.

(21) Appl. No.: 15/001,236

(22) Filed: Jan. 20, 2016

(65) Prior Publication Data

US 2016/0134222 A1 May 12, 2016

Related U.S. Application Data

(63) Continuation of application No. 14/217,384, filed on Mar. 17, 2014, now abandoned.

(60) Provisional application No. 61/801,430, filed on Mar. 15, 2013.

(51) Int. Cl.
| | |
|---|---|
| *H02P 27/06* | (2006.01) |
| *B60L 7/14* | (2006.01) |
| *B60L 8/00* | (2006.01) |
| *B60L 50/51* | (2019.01) |
| *B60L 58/21* | (2019.01) |
| *F03B 13/00* | (2006.01) |
| *F03D 9/00* | (2016.01) |
| *F03D 9/11* | (2016.01) |
| *F03D 9/25* | (2016.01) |
| *H02J 7/35* | (2006.01) |
| *H02P 25/22* | (2006.01) |
| *H02P 27/08* | (2006.01) |
| *H02S 10/12* | (2014.01) |

(52) U.S. Cl.
CPC ............ *H02P 27/06* (2013.01); *B60L 8/003* (2013.01); *B60L 8/006* (2013.01); *B60L 50/51* (2019.02); *B60L 58/21* (2019.02); *F03B 13/00* (2013.01); *F03D 9/007* (2013.01); *F03D 9/11* (2016.05); *F03D 9/25* (2016.05); *H02J 7/35* (2013.01); *H02S 10/12* (2014.12); *B60L 2200/10* (2013.01); *B60L 2210/30* (2013.01); *B60L 2210/40* (2013.01); *B60L 2240/421* (2013.01); *Y02E 10/76* (2013.01); *Y02T 10/64* (2013.01); *Y02T 10/70* (2013.01); *Y02T 10/7072* (2013.01); *Y02T 10/72* (2013.01)

(58) Field of Classification Search
CPC .... B60L 11/1861; B60L 7/14; B60L 2210/40; B60L 11/1803; B60L 3/0046; B60L 2210/30; B60L 11/1811; B60L 11/1809; H02P 27/06; H02P 27/08; H02P 25/22; H02H 7/18
USPC .............. 318/139, 140, 400.26, 400.27, 472; 180/65.1, 65.21, 65.23, 65.28, 65.29, 180/65.31; 320/101, 104
See application file for complete search history.

(56) References Cited

U.S. PATENT DOCUMENTS

| | | | | |
|---|---|---|---|---|
| 5,589,743 | A * | 12/1996 | King | B60K 6/36 |
| | | | | 180/65.245 |
| 7,478,672 | B2 * | 1/2009 | Rogers | E21B 21/106 |
| | | | | 166/250.15 |
| 8,008,876 | B2 * | 8/2011 | Yonemori | B60L 15/007 |
| | | | | 318/151 |

(Continued)

*Primary Examiner* — Thai T Dinh
(74) *Attorney, Agent, or Firm* — Scott Maddox

(57) ABSTRACT

An electrical device comprising: a high voltage DC power storage system; a variable frequency drive comprising DC terminals, a variable frequency inverter, and a variable drive output, wherein said high voltage DC power source is direct fed to said DC terminals; and an AC motor connected to said variable drive output.

5 Claims, 2 Drawing Sheets

(56) References Cited

U.S. PATENT DOCUMENTS

| | | | |
|---|---|---|---|
| 8,198,836 B2* | 6/2012 | Kachi | B60W 20/00 |
| | | | 318/139 |
| 8,344,677 B2* | 1/2013 | Takizawa | H02M 1/32 |
| | | | 318/500 |
| 2007/0125417 A1* | 6/2007 | Johanson | H01L 31/048 |
| | | | 136/244 |
| 2009/0015202 A1* | 1/2009 | Miura | B60W 20/00 |
| | | | 320/132 |
| 2011/0168462 A1* | 7/2011 | Stanek | B60L 7/18 |
| | | | 180/65.1 |
| 2012/0013182 A1* | 1/2012 | Minegishi | B60K 6/365 |
| | | | 307/9.1 |
| 2012/0146572 A1* | 6/2012 | Ward | B60L 8/003 |
| | | | 320/101 |
| 2014/0070544 A1* | 3/2014 | Bronicki | H02K 7/1823 |
| | | | 290/4 C |

* cited by examiner

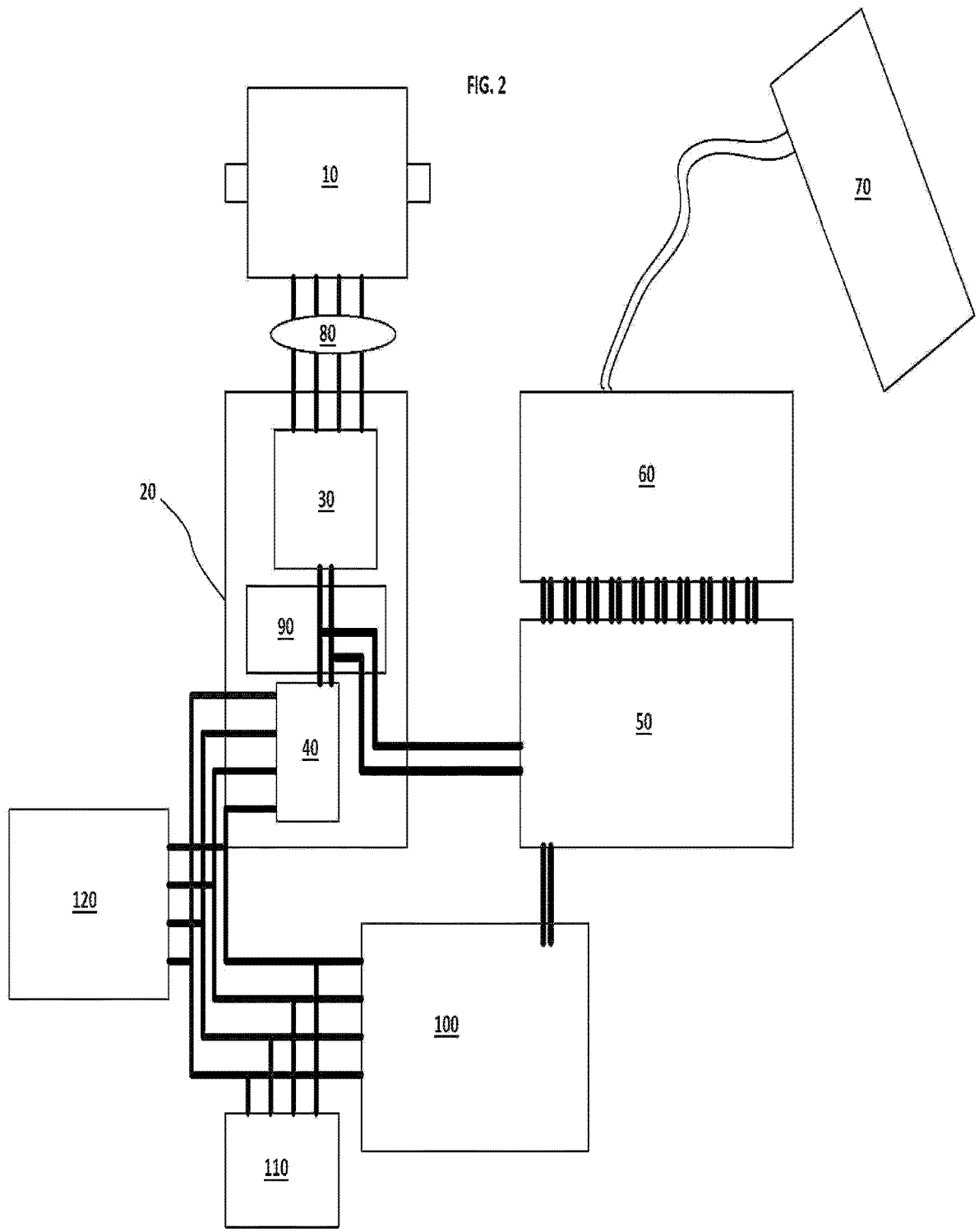

SOLAR A/C DIRECT MOTOR DRIVE

BACKGROUND

Changes in regulations are forcing oil producers to replace simple well head gas engines with alternatives. Solar panels with motors can be a cost effective alternative. CARB emission regulations are forcing the shutdown of small reciprocating engines, typically used in the oil field industry. At present, the only method for replacement of low speed reciprocating engines is with electric powered motors. Power must be brought in by overhead cable, underground cable or local generation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SPECIFICATION

Embodiments described comprise a solar battery powered variable frequency drive that can power AC motors. A solar panel array is connected in series with a high voltage battery bank through a charge controller. The high voltage battery bank is connected directly to DC terminals of a variable frequency drive. Embodiments eliminate AC inverters between DC batteries and a variable frequency drive (VFD). Generally, VFDs require AC power input rather than DC input. Embodiments operate with greater efficiency than is possible using an additional inverter. An embodiment can be used for any AC motor application. The installed cost is also reduced and reliability increased with fewer components.

A high voltage battery bank may comprise sealed deep cycle lead acid batteries or liquid nickel-cadmium batteries, or another type of DC electricity storage system. In another embodiment, the high voltage battery bank may be replaced or supplemented with a different type of DC power source. An embodiment may be mounted on low-weight skids to increase portability.

An embodiment may comprise a three-phase, explosion-proof motor, armored cable to connect the motor. An embodiment may comprise a satellite system to relay health and status monitoring of the equipment.

While certain embodiments are for use in re-powering oil field pump jacks, embodiments can be used anywhere for any application requiring powering of an AC motor. Water pumps for a local water supply are an example of another application.

BRIEF DRAWING DESCRIPTIONS

FIG. 2 shows an embodiment comprising a solar powered motor and additional components.

These and other features, aspects, and advantages of an embodiment will become better understood when the following detailed description is read with reference to the accompanying drawings in which like characters represent like parts throughout the drawings.

DETAILED DRAWING DESCRIPTIONS

Figure 1:
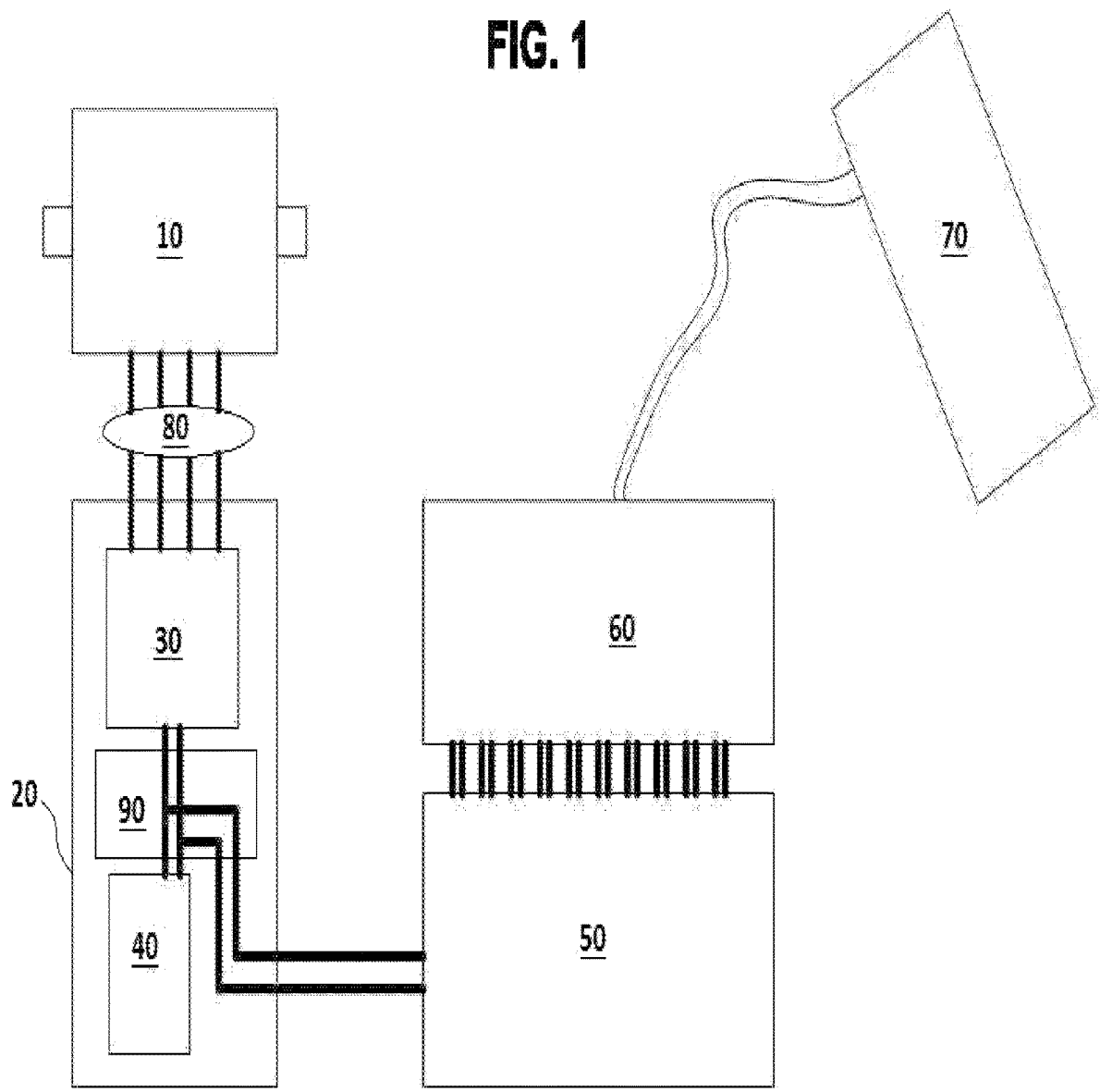
FIG. 1 shows an embodiment comprising a solar powered motor.

An embodiment comprises an electrical device wherein a high voltage DC battery bank or other DC storage system feeds directly to the DC Bus of a VFD (Variable Frequency Drive).

FIG. 1

An embodiment shown in FIG. 1 may be used to power AC motors, and may comprise one or more solar panel arrays 70, a high voltage battery bank 50 comprising one or more DC batteries, or a variable frequency drive 20 (VFD). The VFD 20 comprises a variable drive output 80 to a motor 10. An embodiment may be powered by a solar panel array 70, a battery bank 50 or a combination of both. A variable frequency drive may comprise an AC to DC module 40 or a variable frequency inverter 30.

The illustrated embodiment converts DC power from the solar panel array 70 or high voltage battery bank 50 to variable frequency AC power suitable for an AC motor 10. The VFD 20 limits in-rush current and allows variable power and speed operation, ultimately allowing more efficient operation. Additional efficiency is gained by directly feeding the DC power to the DC terminals 90 in the VFD 20 instead of inverting the DC power first, as is the usual practice.

A solar panel array 70 is connected to high powered battery bank 50 through a charge controller 60. A charge controller 60 may be maximum power point tracking (MPPT) type or standard type. A high voltage battery bank 50 is connected in a high voltage configuration to allow direct feeding of DC terminals 90 of a VFD 20.

FIG. 2

An embodiment shown in FIG. 2 is similar to the embodiment shown in FIG. 1, but comprises additional components allowing it to optionally function in a more conventional manner. Like a device according to FIG. 1, it may be used to power AC motors, and may comprise a DC power source 70 which may comprise one or more solar panel arrays, a high voltage battery bank 50 comprising one or more DC batteries, and a VFD 20 that comprises a variable drive output 80 to a motor 10. An embodiment may be powered by a DC power source 70, a battery bank 50, or a combination of both. A variable frequency drive may comprise an AC to DC module 40 or a variable frequency inverter 30.

The illustrated embodiment can convert DC power from the solar panel array 70 or high voltage battery bank 50 to variable frequency AC power suitable for an AC motor 10. The VFD 20 limits in-rush current and allows variable power and speed operation, ultimately allowing more efficient operation. Additional efficiency is gained by directly feeding the DC power to the DC terminals 90 in the VFD 20 instead of inverting the DC power first, as is the usual practice.

In a conventional mode of operation, a DC power source 70, which could comprise a Solar panel array, is connected to a charge controller 60, which in turn is connected to a high voltage battery bank 50, which in turn is connected to an inverter or inverter charger 100. The inverter 100 can optionally be connected to and power fixed frequency AC devices 110. The inverter 100 is connected to AC to DC module 40. AC to DC module 40 can optionally receive AC power from an AC power source 120, which could comprise a standby generator. An inverter is typically about eighty seven percent efficient and an AC to DC module is typically about 93 percent efficient, so when the device operates in the conventional mode losses of about 24 percent should be expected. An advantage of the embodiments shown in FIGS. 1 and 2 is that when power is routed directly from high voltage battery bank 50 to DC terminals 90 these losses are avoided.

A solar panel array 70 is connected to high powered battery bank 50 through a charge controller 60. A charge controller 60 may be maximum power point tracking (MPPT) type or standard type. A high voltage battery bank 50 is connected in a high voltage configuration to allow direct feeding of DC terminals 90 of a VFD 20.

In certain embodiments, depending on the VFD's 20 output voltage and the motor's 10 voltage rating, it may be beneficial, or even necessary, to have a transformer between the VFD 20 and the motor 10.

In some embodiments, a charge controller 60 may be replaced with a reverse power diode. Other DC power sources may be connected to the charge controller, including but not limited to wind or hydropower. A battery bank may be replaced with any appropriate DC energy storage system.

When an intermittent AC power source is available it could supply AC power to the AC to DC module 40. An embodiment could comprise a means to charge the batteries from the intermittent AC power source, wherein the means to charge the batteries comprises a charger or an inverter charger. An intermittent AC power source could comprise a standby AC fossil fueled generator, a water powered generator, a wind powered generator, or other such devices.

Embodiments shown in FIGS. 1 and 2 comprise variable frequency drives 20 that are commonly available at present, but an embodiment could also comprise a purpose-built DC only VFD 20 that does not comprise an AC to DC module 40. This type of embodiment would be useful for places where an AC source for the VFD 20 will never be needed. Weight and cost savings can be realized by omitting an AC to DC module 40. Embodiments can be useful for many off-grid situations. Embodiments could power water pumps, oil pumps and even be the drive for a transportation system. Embodiments could be useful for many situations where the final motor speed needs to be controlled and to operate at different speeds and output levels. Embodiments could be adapted to HVAC systems where the motor speed can be varied.

Embodiments would generally not be an ideal replacement for a standard inverter in applications where devices require standard fixed frequency AC power.

An advantage that embodiments provide in transportation applications could comprise reduction in weight (AC motors are lighter than DC motors) and cost (AC Motors are less expensive than DC). Also, embodiments comprising a VFD, allow the motor to run at the most efficient power level and speed, maximizing efficient use of stored energy.

Embodiments can replace environmentally harmful motors used in the oil field to operate pump jacks. It should be appreciated that embodiments could be useful in many applications where controlling the motor speed is desired.

An embodiment could be well suited to power an electric car or other electric vehicle. Compared to a vehicle comprising a DC motor, a vehicle in accordance with an embodiment will weigh less and the AC motor will be more efficient. Embodiments could power either pure electric or hybrid vehicles. An embodiment for a pure electric vehicle would likely not comprise an AC to DC module. An embodiment for a hybrid or semi-hybrid vehicle would likely comprise and make use of an AC to DC module.

An embodiment could be well suited to power a solar powered aircraft or drone. Solar cells on the wings of an aircraft could be used to re-charge batteries. Compared to an aircraft/drone that has DC motors, embodiments would allow better control over motors permitting more efficient use of the energy stored in batteries and lighter AC motors.

An embodiment comprising a transformer could use a higher voltage motor than otherwise, and the higher voltage motor would be lighter while providing the same power.

An embodiment could incorporate and integrate all the described system components, removing the need for a charger and fixed inverter. An embodiment's AC to DC module could be bi-directional, allowing it to power other AC devices from the batteries and to supply AC power to recharge the batteries.

An embodiment could comprise more than one VFD that can be connected to external AC sources and/or to the DC Bus.

Embodiments typically comp regenerative VFD, but other embodiments could comprise a non-regenerative VFD.

Embodiments that use only DC power sources would not necessarily comprise AC to DC modules.

For some embodiments, more than one motor can be connected to a VFD

An embodiment could be connected to more than one AC power source.

An embodiment can be connected to more than one DC power source. DC power sources could be solar powered, wind powered, etc. DC power sources can be connected to a high voltage DC power storage system. Some embodiments may require additional charge controllers to match the DC source voltage to the high voltage DC power storage system.

An embodiment's high voltage "battery bank" can comprise any high voltage DC power storage system. Voltage developed by a high voltage power storage system should be compatible with the DC Bus of the VFD.

Examples of system efficiencies listed herein are for illustrative purposes only, and it should be appreciated that embodiments can comprise any VFD components or inverters even if their efficiency is different.

Generally A/C motors are 6 to 10 times less expensive than similar DC motors.

Generally, A/C motors are smaller and weigh less than DC motors. Higher voltage Motors could be used by placing a transformer (Wound, Digital, Electronic or other type) between the output from the VFD and the A/C Motor(s). This could potentially reduce the weight of the Motor, though the weight of the transformer must be considered when assessing potential weight savings.

While only certain features of certain embodiments have been illustrated and described herein, many modifications and changes will occur to those skilled in the art. It is, therefore, to be understood that the appended claims are intended to cover any such modifications and changes as fall within the true spirit of an embodiment.

The invention claimed is:

1. An electrical device comprising:
    a high voltage DC power storage system;
    a variable frequency drive comprising an AC to DC module, DC bus, a variable frequency inverter, and a variable drive output,
    wherein said AC to DC module comprises an input for an AC power source;
    wherein said high voltage DC power storage system is direct fed to said DC bus;
    wherein said high voltage DC power storage system comprises a high voltage battery bank;
    a solar panel array connected to a charge controller and said charge controller is connected to said high voltage DC power storage system;
    wherein said solar panel array provides DC electrical power generation sufficient to power said electrical device; and
    an AC motor connected to said variable drive output.

2. The electrical device according to claim 1 wherein said AC motor comprises a three phase explosion proof motor that is connected to said variable drive output with armored cable.

3. The electrical device according to claim 1 wherein said motor powers a pump.

4. The electrical device according to claim 1 wherein said motor powers an electric vehicle's propeller.

5. The electrical device according to claim 1 wherein said motor powers an electric vehicle's rotor.

\* \* \* \* \*